US012615003B2

(12) United States Patent
Ehman et al.

(10) Patent No.: US 12,615,003 B2
(45) Date of Patent: Apr. 28, 2026

(54) GREENFIELD LOW-PROFILE DENSE-SPACED SOLAR PANEL ARRAY ENERGY SYSTEM

(71) Applicant: Watershed Geosynthetics LLC, Alpharetta, GA (US)

(72) Inventors: S. Kyle Ehman, Milton, GA (US); Carl M. Davis, III, Canton, GA (US)

(73) Assignee: Watershed Geosynthetics LLC, Alpharetta, GA (US)

( * ) Notice: Subject to any disclaimer, the term of this patent is extended or adjusted under 35 U.S.C. 154(b) by 61 days.

(21) Appl. No.: 18/287,967

(22) PCT Filed: Apr. 22, 2022

(86) PCT No.: PCT/US2022/025886

§ 371 (c)(1),
(2) Date: Oct. 23, 2023

(87) PCT Pub. No.: WO2022/226268

PCT Pub. Date: Oct. 27, 2022

(65) Prior Publication Data

US 2024/0195344 A1     Jun. 13, 2024

Related U.S. Application Data

(60) Provisional application No. 63/178,511, filed on Apr. 22, 2021.

(51) Int. Cl.
*H02S 20/10* (2014.01)

(52) U.S. Cl.
CPC .................................... *H02S 20/10* (2014.12)

(58) Field of Classification Search
CPC ......... H02S 20/10; Y02E 10/47; Y10T 24/27; A44B 13/0035; A44B 17/0011;
(Continued)

(56) References Cited

U.S. PATENT DOCUMENTS

| | | |
|---|---|---|
| 10,992,250 B2 | 4/2021 | Ayers |
| 11,277,091 B2 | 3/2022 | Ayers |

(Continued)

FOREIGN PATENT DOCUMENTS

WO     2021055619 A1     3/2021

OTHER PUBLICATIONS

International Search Report for Application No. PCT/US2022/025886, dated Jun. 23, 2022, 3 pages.
(Continued)

*Primary Examiner* — Angelo Trivisonno
(74) *Attorney, Agent, or Firm* — Baker Donelson; Carl M. Davis, II

(57) ABSTRACT

A solar energy racking system for a plurality of solar panels for generation of electrical energy comprising a pair of opposing elongated rails for disposing in spaced-apart relation on a surface and secured thereto with a pair of anchors for each elongated rail, said anchors for connecting to the surface and to respective opposing portions of the elongated rail; and a solar photovoltaic module for securing to the pair of rails with a plurality of clips. A plurality of solar panels mount to the rails in a dense-space array having a Slow-profile relative to the surface. Optionally an intermediate engaging member attached to the rails intermediate the anchors further secures the rails to the surface.

17 Claims, 5 Drawing Sheets

(58) Field of Classification Search
    CPC ............ A44B 18/0011; A44B 18/0034; A44B
                                18/0088; A44B 18/0073
    See application file for complete search history.

(56)                        References Cited

U.S. PATENT DOCUMENTS

| | | | |
|---|---|---|---|
| 2011/0277296 A1* | 11/2011 | Ramos | F24S 25/65 |
| | | | 29/428 |
| 2013/0056595 A1 | 3/2013 | Tomlinson | |
| 2018/0269826 A1* | 9/2018 | Urrutia | H02S 30/10 |
| 2018/0367090 A1 | 12/2018 | Ayers | |
| 2018/0367093 A1 | 12/2018 | Ayers | |
| 2019/0158013 A1* | 5/2019 | Boguess | H02S 40/38 |
| 2019/0222162 A1 | 7/2019 | Ehman | |
| 2020/0366234 A1 | 11/2020 | Ayers | |

OTHER PUBLICATIONS

International Written Opinion for Application No. PCT/US2022/025886, dated Jun. 23, 2022, 8 pages.
3M Company, "Designing with 3M Dual Lock Reclosable Fasteners", Industrial Adhesives and Tapes Division 3M Center, Building 225-3S-06, St. Paul, MN 55144 USA (2019).

\* cited by examiner

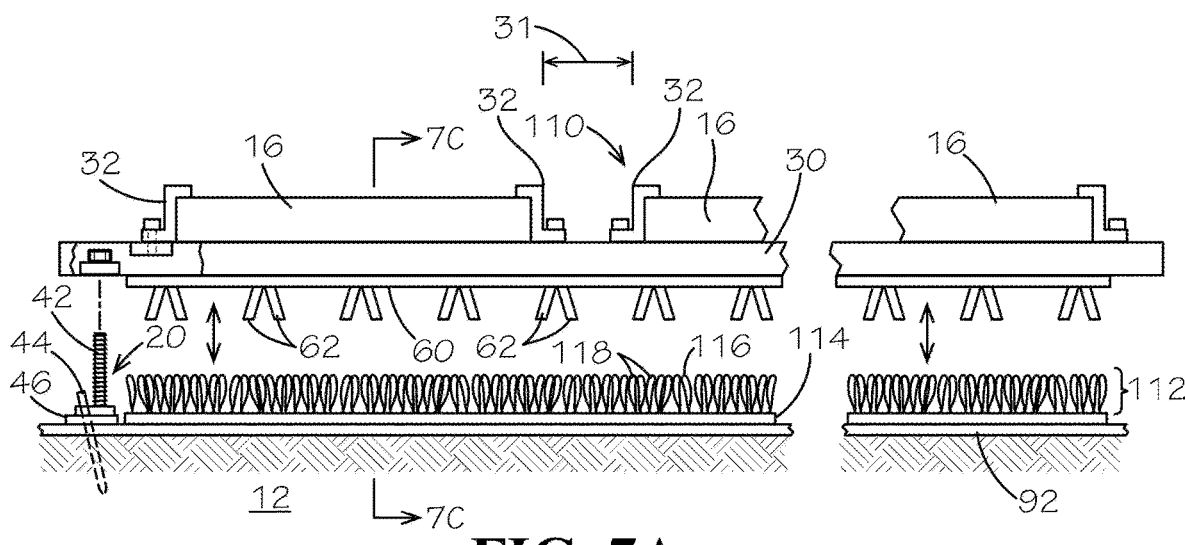
FIG. 7A
FIG. 7B
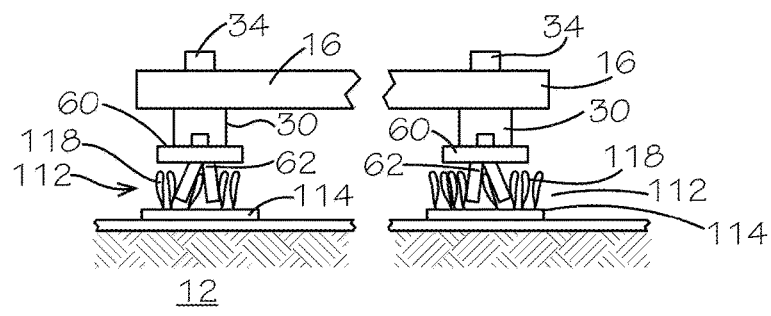
FIG. 7C

GREENFIELD LOW-PROFILE DENSE-SPACED SOLAR PANEL ARRAY ENERGY SYSTEM

TECHNICAL FIELD

The present invention relates to solar energy generation systems installed over large area land surfaces. More particularly, the present invention relates to a solar energy generation system of a plurality of solar panels installed as a low-profile densely grouped spaced-relation array on a greenfield land site.

BACKGROUND OF THE INVENTION

Large area land sites offer opportunities for placement of solar photovoltaic modules or panels for alternative renewal energy supply systems to provide electrical power to an electricity distribution grid, including brownfield and greenfield sites. A primary difference between brownfield and greenfield sites is the need to restrict ambient water inflow into brownfield sites and controlled water flow off the brownfield site while greenfield sites are not so restricted as to ambient water flow. This distinguishing site development requirement leads to structural differences for solar panel system installations as well as affords cost savings arising from less expensive racking engagement devices and reduced labor costs for installation.

Greenfield—a land site that is undeveloped and not subject to prior constraints for development, suitable for installation of solar energy generation systems and generally not restricted as to allowing inflow of ambient water into the ground (i.e., not a waste disposal site).

Brownfield—a land site containment for long term disposal of municipal and industry waste and having operator and regulatory restrictions on inflow of ambient water into the ground with the contained waste.

Low-profile—placement of photovoltaic modules or solar panels vertically above and closely to a ground barrier sheet overlying a ground surface site for vegetation control at an orientation that ranges from proximately parallel to the ground surface to about a 15 degree angle relative to the ground surface for exposure of the panels to ambient light; alternatively without a ground barrier sheet; further, embodiments vertically space the solar photovoltaic modules several inches to about 2 feet, such as a range from about 2 inches to about 24 inches, from the ground surface but the racking system may be gainfully deployed to position the solar photovoltaic modules at other heights.

Land sites having installations of photovoltaic modules for generation of electrical energy are not untypically subject to wind forces that flows over the land site. The flat panel photovoltaic modules are typically spaced apart and mounted on racking systems angled at a high-profile optimally for facing the sun. The spacing is necessary to avoid a photovoltaic module from casting a shadow on an adjacent photovoltaic module. The shadows reduce the energy generation capacity of the solar power site. The high-profile angling of the photovoltaic modules is for the purpose of increasing the efficiency of energy generation. Generally, photovoltaic panels produce a maximum of energy when the sun is directly perpendicular to them. The earth's position relative to the earth changes during the year. That is, for example in the Northern hemisphere, the position of the sun in the summer is higher relative to the horizon than in the winter. A steeper angle is more efficient in the winter while in the summer a lower angle is more efficient. A high-profile tilted orientation thus will be in range of about 30° to 60°. Generally, tilting photovoltaic modules at the same angle as the latitude of the installation site provides maximum average energy generation during the year. The high-profile angling for efficiency however often positions the photovoltaic module (typically, a 4 foot by 8 foot sheet) even in a landscape orientation with a height of about 5 or 6 feet depending on the tilt angle of orientation and the base height of the racking system. The panels thereby present a broad face to the wind. To resist wind uplift that may cause panel flyaway, heavy ballast such as cement blocks sit on ground members of the racking system. Installation of large area energy generation systems thus are labor intensive.

Alternative developments of solar energy generation sites have used earth anchors that secure the racking system for the photovoltaic modules to the ground. Earth anchors are not appropriate for brownfield sites but are usable for greenfield sites. Earth anchors however also require labor intensive work for installation. Alternatively, friction engagement members of a racking system have surprisingly been found to secure arrays of photovoltaic modules to tufted geotextile sheets overlying a land site while resisting wind uplift of the photovoltaic modules. Friction engagement is suitable for brownfield sites in order to avoid penetrations through the ground cover, which penetrations form flow paths for ambient water. Site operation regulations for brownfields sites generally preclude penetrations in order to restrict water entry. However, system costs associated with the supply and use of tufted geotextiles to overlie a ground cover preclude such use for greenfield sites.

Accordingly, there is a need in the art for an improved structural support apparatus for photovoltaic module solar energy generation systems for installation on greenfield land sites. It is to such that the present invention is directed.

SUMMARY OF THE INVENTION

The present invention meets the need in the art by providing an improved structural support apparatus for photovoltaic module solar energy generation systems for installation on greenfield land sites. The present invention provides an energy generation system, comprising:

a plurality of photovoltaic modules for disposing over a land site; and a racking system for supporting the plurality of the photovoltaic modules on a surface, comprising:

an elongate rail to which the photovoltaic modules attach in spaced-apart relation as a linear array having a leading perimeter photovoltaic module and a trailing perimeter photovoltaic module at opposing ends of the array and at least one intermediate photovoltaic module therebetween;

two ground supports, each comprising a ground engaging member and an opposing connector for engaging to a respective one of a leading and trailing end of the rail proximate a respective one of the leading and trailing perimeter photovoltaic modules in the array; and a friction strip having a plurality of projecting members extending from a bottom surface and the friction strip attached on an upper surface to a bottom surface of the elongate rail, whereby the ground supports being engaged by the ground engaging members to the ground and the projecting members being frictionally engaged to the surface below the friction strip cooperatively restrict the racking system from movement relative to the surface and resist shear wind uplift forces.

In yet another aspect, the present invention provides a solar energy racking system, comprising:

a pair of opposing elongated rails for disposing in spaced-apart relation on a surface;

a pair of anchors for each elongated rail of the pair of opposing elongated rails, said pair of anchors for connecting to the surface and to respective opposing portions of said elongated rail of the pair of opposing elongated rails;

each elongated rail having a friction engaging strip attached intermediate the anchors and a plurality of projecting members extending from a bottom surface of the friction engaging strip;

a geomembrane sheet for overlying the surface, said geomembrane sheet defining a plurality of spaced-apart seats for receiving the plurality of projecting members for mechanical engagement of the friction engaging strip thereto; and a solar photovoltaic module for securing to the pair of rails with a plurality of clips, each one of said plurality of clips for fixedly attaching to a respective elongated rail of the pair of opposing elongated rails and for engaging the solar photovoltaic module, whereby the solar photovoltaic module being secured with the plurality of clips to the opposing elongated rails fastened to the surface for electrical generation.

Further, the solar energy racking system, wherein the plurality of projecting members comprise pairs of projections extending in opposing directions.

The solar energy racking system, further comprising a plurality of fasteners disposed in spaced-apart relation for connecting the friction engaging strips to a respective one elongated rail of the opposing elongated rails.

The solar energy racking system, wherein the plurality of seats comprise recesses each configured for receiving a respective one of the projecting members extending from the friction engaging strip.

Further, the solar energy racking system, wherein the projecting members are arranged in pairs for projections to extend in opposing directions; and wherein the recesses are pairs of pockets oriented at opposing angles for conforming to the pairs of projections.

The solar energy racking system, further wherein each of the pairs of pockets are spaced-apart by a respective bridge, and said bridge receiving a portion of a ground surface overlaid by said geomembrane sheet.

Further, the solar energy racking system, wherein the geomembrane sheet defines a plurality of through openings for flow of ambient water into the ground.

Further, the solar energy racking system, wherein the geomembrane sheet comprises a sheet that depresses flexibly upon seating of the projecting members thereon to define respective valleys that receive the projecting members and ridges for resisting movement of the friction engaging strip.

Further, the solar energy racking system, wherein the geomembrane sheet has a plurality of studs extending from a surface for engaging the projecting members and spacing the geomembrane from the friction engaging strip to define water flow paths.

The solar energy racking system, wherein the geomembrane sheet further comprises a plurality of spikes extending from an opposing surface for engaging a ground surface.

Further, the solar energy racking system, wherein the geomembrane sheet has a plurality of spikes extending therefrom for engaging a ground surface.

The solar energy racking system further comprising an elongated strip of a tufted geotextile attached to the geomembrane sheet, whereby the projecting members extending from the friction engaging strip frictionally engage the tufted geotextile.

Further, the solar energy racking system, wherein the tufted geotextile comprises a backing sheet tufted with a plurality of yarns extending therefrom as blades of simulated grass, whereby the projecting members extending from the friction engaging strip frictionally engage the blades of simulated grass.

The solar energy racking system further comprising second photovoltaic module and a third photovoltaic module, for attaching with the photovoltaic module in spaced-apart relation to the opposing elongated rails as a linear array having a leading perimeter photovoltaic module and a trailing perimeter photovoltaic module at opposing ends of the array and at least one intermediate photovoltaic module therebetween.

The solar energy racking system, wherein each of said pair of anchors comprises a plate, a ground engaging member extending in a first direction therefrom for connecting to the surface, and a threaded rod extending in a second direction for engaging the respective elongated rail.

Further, the solar energy racking system, wherein the pair of opposing elongated rails each have a height for disposing the solar photovoltaic module above a ground surface in a range from about 2 inches to about 24 inches.

Further, the solar energy racking system, wherein the clips are attached in spaced relation for disposing the solar photovoltaic module in adjacent relation to a second solar photovoltaic module with a gap of up to about 6 inches apart.

In yet another aspect, the present invention provides a method of securing solar photovoltaic modules to a surface with a racking system, comprising the steps of:

(a) attaching a friction strip to a bottom surface of an elongated rail, said friction strip having a plurality of projecting members extending from a bottom surface;

(b) fastening said rail to a surface with a pair of ground supports, each ground support comprising a ground engaging member for engaging the surface and an opposing connector for engaging to a respective end of said rail, whereby the friction strip engages the surface; and (c) attaching a pair of solar photovoltaic modules to the rail in adjacent spaced-apart relation with a plurality of clips, whereby the ground supports being engaged by the ground engaging members to the surface and the projecting members being frictionally engaged to the surface below the friction strip cooperatively restrict the solar photovoltaic modules from movement relative to the surface and resist shear wind uplift forces.

The method of securing solar photovoltaic modules to a surface with a racking system, further comprising the step of overlaying the surface with a ground barrier for engagement by the friction strip.

Further, the method of securing solar photovoltaic modules to a surface with a racking system, wherein the ground barrier is selected from the group comprising a ground cover sheet, a geomembrane, a structured geomembrane, a textured geomembrane, a geomembrane having a plurality of through openings, a geomembrane configured with a plurality of spaced-apart seats that receive the projections for mechanical engagement of the friction strip, and a tufted geotextile.

Objects, advantages, and features of the present invention will become readily apparent upon a reading of the following detailed description in conjunction with the drawings.

BRIEF DESCRIPTION OF THE DRAWINGS

FIG. 7A illustrates a detailed side view of a fifth embodiment of a low-profile solar energy system installed on a greenfield land site, having strips of a tufted geotextile attached to a geomembrane covering the greenfield land site and secured fastening of a friction member to a rail for frictional engagement of the rail to the geomembrane ground cover for supporting the photovoltaic panels.

FIG. 7B illustrates an end view of the fifth embodiment of the low-profile solar energy system illustrated in FIG. 7A, installed on a greenfield land site with the spaced-apart strips of the tufted geotextile attached to the geomembrane covering the greenfield land site and the friction member secured to the rail for frictional engagement to the geomembrane ground cover for supporting the photovoltaic panels.

FIG. 7C illustrates an end view of the fifth embodiment of the low-profile solar energy system illustrated in FIG. 7A, installed on a greenfield land site with the friction member engaged to the tufts of the tufted geotextile attached to the geomembrane covering the greenfield land site for frictional engagement of the rail supporting the photovoltaic panels to the geomembrane ground cover.

DETAILED DESCRIPTION

With reference to the drawings, in which like parts have like identifiers, the present invention provides a solar energy system readily installed on greenfield land areas for generation of electrical energy for supply to an electrical distribution grid, which solar energy system uses an array of a plurality of photovoltaic modules or panels closely spaced apart and mounted on a racking system that spaces the panels in a low-profile orientation vertically above a ground barrier sheet that covers an installation ground site for vegetation control and for exposure of the panels to ambient light, with opposing leading and trailing end portions of the racking system secured by respective earth engaging members that engage into the ground and interior portions of the racking system secured by friction members to the ground barrier sheet. The leading and trailing opposing ends of the racking system are proximate the "perimeter panels" of the array, which perimeter panels refers to the leading or trailing panels of a connected longitudinal line of the panels attached to the racking system in the array, which leading or tailing panel is adjacent another panel on one side but is not adjacent panels on opposing sides in the connected line of panels.

Figure 1:
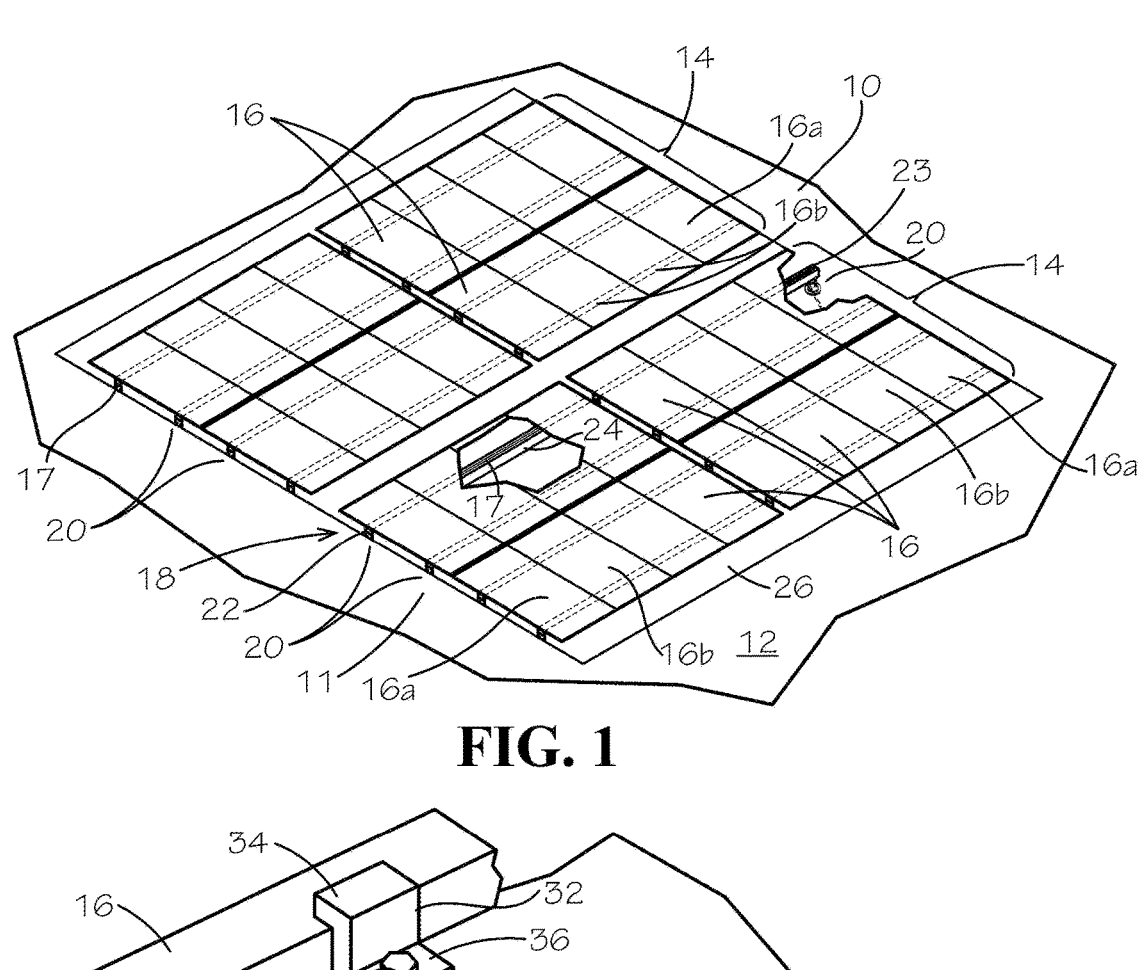
FIG. 1 illustrates a top plan view of a solar energy system in accordance with the present invention installed on a greenfield land site an elongated rail secured at opposing ends by respective earth anchors and intermediate portions of the rail secured by frictional engagement to a surface of the greenfield land site.

FIG. 1 illustrates a solar energy system 10 and a racking structure generally 11 in accordance with the present invention for installation on a greenfield 12 or ground surface, for generating electrical energy using an array 14 of a plurality of photovoltaic modules or panels 16. The racking system 11 supports the photovoltaic modules 16 spaced vertically from a surface. The racking system 11 comprises a plurality of spaced-apart elongated rails 17, ground engaging anchors 20, and intermediate ground engaging members 24. The opposing leading and trailing ends 22, 23 of the rails 17 secure in place by respective ones of the earth engaging devices 20, such as an earth anchor. The earth anchor may be an elongated nail or spike and optionally with a textured exterior for gripping engagement with soil or ground, or an elongated shaft having a helical flight for threadingly engaging the ground. The rails 17 further secure in place by an intermediate friction-engaging member 24, that engages optionally to a ground cover 26 overlying the greenfield land site or alternatively to a surface of the greenfield 12 without the ground cover. The ground cover 26 further provides vegetation control. The solar energy system 10 disposes the photovoltaic panels 16 in a low-profile orientation and closely spaced and mounted on the rails 17 of the support racking system 11. The low-profile orientation positions the photovoltaic modules 16 vertically above and closely to the ground barrier cover 26 overlying the greenfield ground surface site (or the ground 12), and positioned at an orientation that ranges from proximately parallel to the ground surface to about a 15 degree angle relative to the ground surface for exposure of the panels to ambient light. The angle may be selectively accomplished with risers, for example, attached to an upper surface of the rails, for example, in graduated heights. The solar photovoltaic modules 16 are disposed dense-spaced closely together with a gap 31 between adjacent solar photovoltaic modules (see FIG. 7A); the gap 31, for example, of up to about 6 inches, preferably about 1 inch to about 2 inches, although a greater gap distance may gainfully be used to provide maintenance access.

A pair of the earth engaging devices 20 install in the racking system 11 at the respective opposing leading and trailing end 22, 23 of the rail 17 proximate respective perimeter photovoltaic modules 16a of the solar energy system 10. The perimeter photovoltaic module 16a is a first or last photovoltaic module 16 in an aligned column of photovoltaic modules in the array 14. The intermediate portion of each of the rails 17 of the racking system 11 supporting interior ones 16b of the photovoltaic modules 16 uses the friction engaging strip 24 that optionally engages to the ground barrier cover 26 or to the surface of the greenfield ground 12. The frictional engagement of the racking system 24 with the ground barrier 26 (or ground 12) cooperatively with the earth engaging devices 20 resists wind uplift forces and retains the racking system 11 in place from movement. The combined earth engaging devices 20 and the friction engaging strip 24 reduces materials cost for the solar energy system 10 and reduces labor time installation costs yet surprisingly supports the photovoltaic panels 16 while resisting wind uplift forces. Alternate embodiments of the greenfield solar energy system are disclosed below.

The ground barrier 26 comprises an elongated sheet material readily rolled for transportation and handling, and may be formed as an extruded sheet member such as a geomembrane or molded sheet for joining of adjunct sheets during installation as a site ground covering. The ground barrier may be formed in various alterative structures including smooth, textured, or structured. The structured ground barrier may be configured for male/female engagement with the friction engaging strip 24 by providing pockets, seats, openings, or formed in situ recesses, that receive elongated projecting members such as fingers, studs, stubs, barbs, or feet extending from the friction engaging strip 24.

An alternate embodiment of the ground barrier 26 may have a plurality of drainage studs extending from an upper surface for engaging the projecting members of the friction engaging strip 24. Another alternate embodiment of the ground barrier 26 may have a plurality of spikes extending in space-apart relation from a bottom surface of the ground barrier 26 for grippingly engaging a surface, for example, the greenfield ground 12 over which the ground barrier is deployed. Another alternate embodiment of the ground barrier 26 may have both the drainage studs on a first surface and the spikes on an opposing second surface. The ground barrier 26 is formed of a suitable material for on-ground and wet environments, such as EDPM, polyethylene, polypropylene, polyethylene, or other plastics materials.

Figure 2:
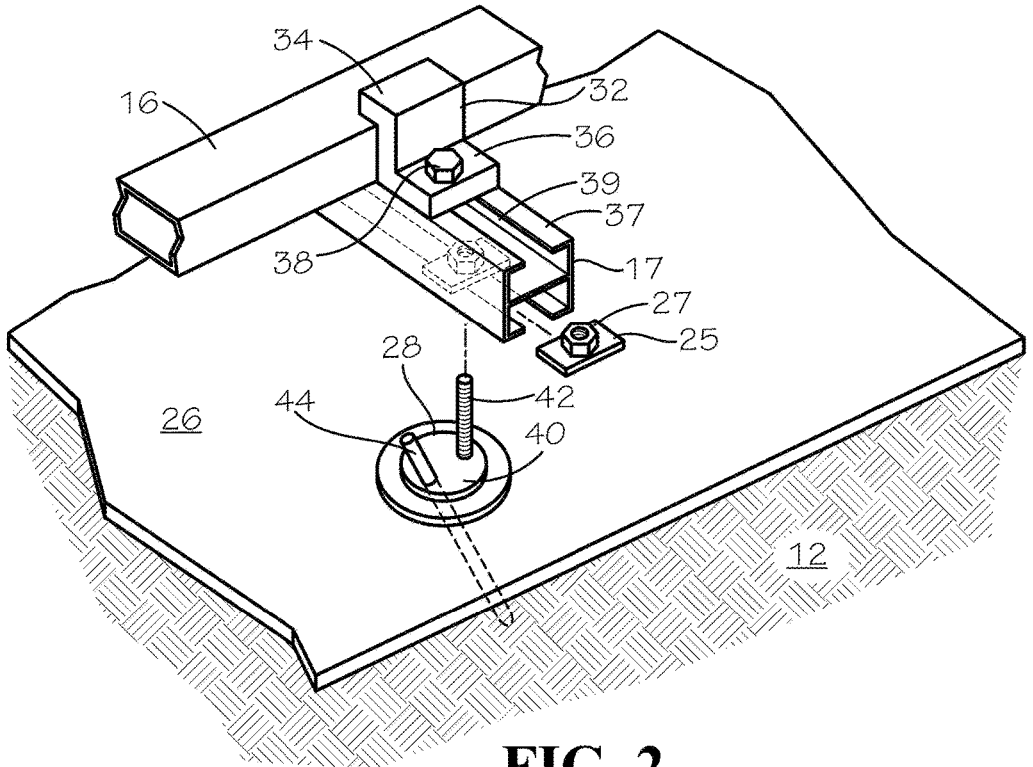
FIG. 2 illustrates a detailed perspective view of an end portion of a rail supporting an array of low-profile spaced-apart photovoltaic modules of the solar energy system installed on a greenfield land site illustrated in FIG. 1.

FIG. 2 illustrates a detailed perspective view of an end portion of one of the rails 17 of the racking system 11. The rail 17 of the racking system 11 supports the low-profile array 14 of spaced-apart photovoltaic modules 16 and the ground barrier cover 26 overlies a surface of the ground 12. The racking system 11 includes first and second spaced-apart elongate rails 17 to which the photovoltaic modules 16 attach in closely spaced relation on an upper surface of the rail as the array 14. A clip 32 has an upper plate 34 and a lower plate 36 extending in opposite directions from a connecting member 33. The upper plate 34 seats on an upper edge of the photovoltaic module 16. The lower plate 36 defines an opening for receiving a fastener 38 that secures the clip 32 to the rail 17. In the illustrated embodiment, the rail 17 has opposing flanges 37 that define a slot 39. The slot 39 facilities sliding movement of components of the fastener 38. The components may be a securing plate received inwardly of the rail through the slot for engaging a threaded fastener 38. Alternatively, the rail 11 has an upper plate between the opposing sides of the rail to support the photovoltaic module 16. The plate in an embodiment may define an opening for receiving a fastener to secure the photovoltaic module. In an alternate embodiment, a self-tapping screw may be driven into the upper plate. In yet another alternate embodiment, the fastener engages a bracket or plate extending laterally from the photovoltaic module. The opposing bottom surface of the rail may be similarly configured (i.e., slot-defining opposing flanges or a member extending between opposing sides of the rail to close the rail.)

The pair of the earth engaging devices 20 secure to the respective opposing end portions 22. 23 of the rail 17 and engage the ground 12. The earth engaging devices 20 may be an earth anchor such as an elongated nail or spike and optionally with a textured exterior for gripping engagement with soil or ground, or an elongated shaft having a helical flight for threadingly engaging the ground. In the illustrated embodiment, the earth-engaging device 20 includes a plate 40 and a threaded rod 42 extending in a first direction. A distal end of the threaded rod 40 extends into the rail 17 (such as through the slot in the bottom side of the rail), and is secured with a fastener such as a plate 25 and attached nut fastener 27. A nail 44, or other earth fastener device, extends oppositely from the plate 40 for engaging the ground 12. The nail 44 extends through the ground barrier cover 26 and engages the ground 12. A resilient seal 46 optionally seals between the plate 40 and the ground barrier cover 26. The seal 46 may be a resilient washer underlying the plate 40 or may be a flowable sealant deposited on the ground barrier cover 26 and around the plate 40.

Figure 3:
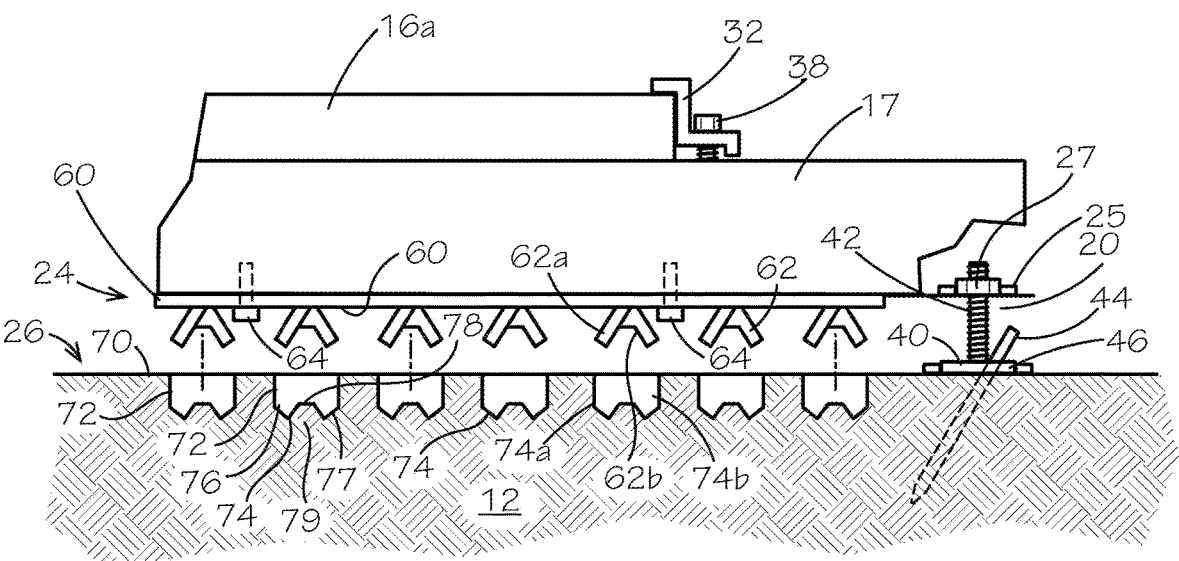
FIG. 3 illustrates a detailed side view of a first embodiment of a low-profile solar energy system installed on a greenfield land site, providing mating engagement of a ground cover and a friction member for securing a support rail for the photovoltaic modules to the ground cover.

FIG. 3 illustrates a detailed side view of a first embodiment solar energy system 50 of the solar energy system 10 installed on the greenfield land site 12, providing mating engagement of the ground cover 26 and the friction member 24 for securing the support rails 17 to the ground cover (or optionally to the ground 12 if the ground cover is not deployed) for supporting the plurality of photovoltaic modules 16. The friction-engaging device 24 comprises an elongate strip 60 having a plurality of projecting members 62, such as fingers, studs, stubs, barbs, or feet, that extend angularly from a bottom surface in spaced-relation. The projecting members 62 may be arranged in pairs that extend from proximate the same portion of the elongate strip 60 in opposing directions. A distal end of the projecting member 62 bears against the ground barrier 26. A plurality of threaded members 64 connect the elongate strip 60 to a bottom surface of the rail 17. The projecting members 62 frictionally engage the rail 17 to the ground barrier cover 26. An alternate embodiment does not use the ground barrier 26, and the projecting members 62 engage the ground 12.

The ground barrier cover 26 in the illustrated embodiment comprises an elongated sheet 70 with spaced-apart pockets 72 that align with the spacing of the projecting members 62 of the elongated strip 60. In the illustrated embodiment, the pockets 72 define opposing seats 74, wells, recesses, or receiving socket. The seats 74 define opposing angular walls 76, 77 and a bridge 78 between the opposing walls 77, to conform in cross-section to the projecting members 62. When placed on a ground surface, soil may pack into an intermediate gap 79 between the opposing walls 77 and the bridge 78. Soil may also pack into the gaps between adjacent pockets 72. The pockets 72 define female receivers that receive respective male portion projecting members 62 of the friction strip 60. In the illustrated embodiment, a first seat portion 74a receives a first projecting member 62a while a second seat portion 74b receives an opposing second projecting member 62b of the projecting member 62. In this embodiment, soil packs into intermediate gap 79 during installation of the ground barrier 26 and the racking system 11 for supporting the photovoltaic modules 16. The combined plurality of the pockets 72 and respective soil-packed interior gaps 79 with the opposing angular orientation of the paired projecting members 62a, 62b provide resistance to movement of the friction strip 24 and resist shear wind uplift forces over and through the solar power system 10 installed at the land site.

FIG. 3 also illustrates a connector 83 received within respective end portions of adjacent lengths of the rails 17 during site installation of the solar energy system. Fasteners 85 secured the connector and the rails.

Figure 3A:
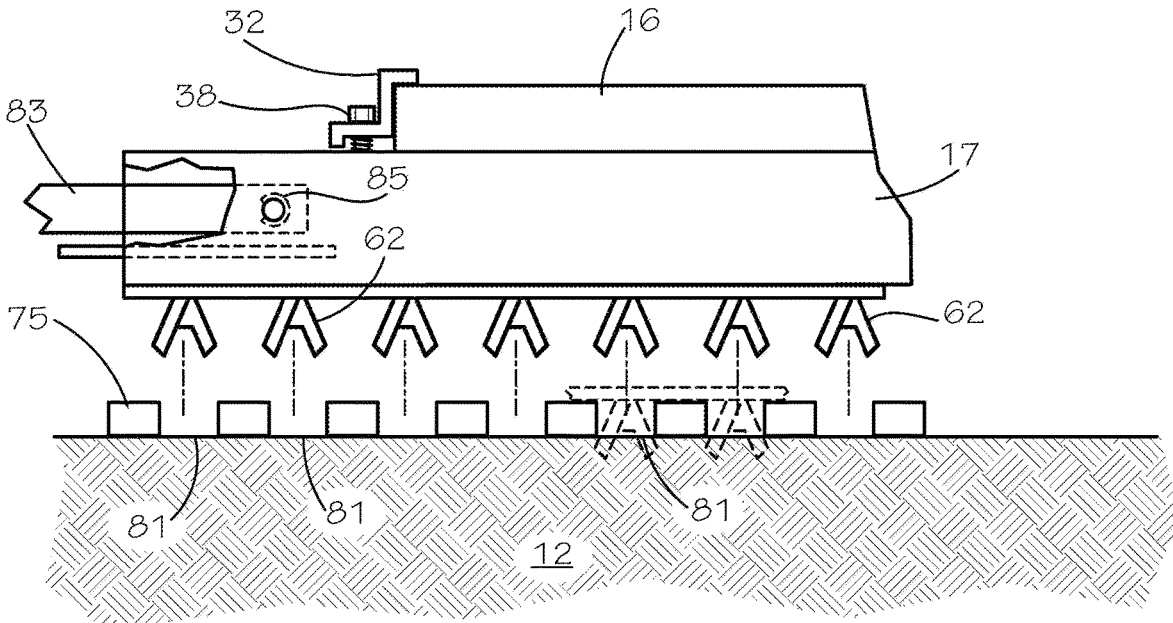
FIG. 3A illustrates an alternate embodiment of the energy generation system illustrated in FIG. 3, in which a ground barrier defines spaced-apart through openings for engagement of the friction member into a ground surface.

A greenfield application for the solar energy system 10 may readily accommodate inflow of ambient water such as from rainfall or snow precipitation. FIG. 3A illustrates an alternate embodiment of the energy generation system 10 in which a ground barrier 75 defines spaced-apart through openings 81 rather than the pockets 72. In this embodiment, the distal portions of the projecting members 62 extend through the respective through-opening 81 in the ground barrier 75 and into the ground 12 as shown illustratively in broken line, for resistance to movement of the racking system. Water from ambient environmental precipitation such as rain or snow may flow through the through openings 81 into the ground 12. The ground barrier 75 may be molded to feature depending sides that extend to an open bottom through-opening, or receiving well, sink, or recess. In an alternate embodiment, the ground barrier 75 is an elongated thin planar sheet with the plurality through openings 81 or apertures such as formed by punching, through which the members 62 may extend into the ground.

Figure 4:
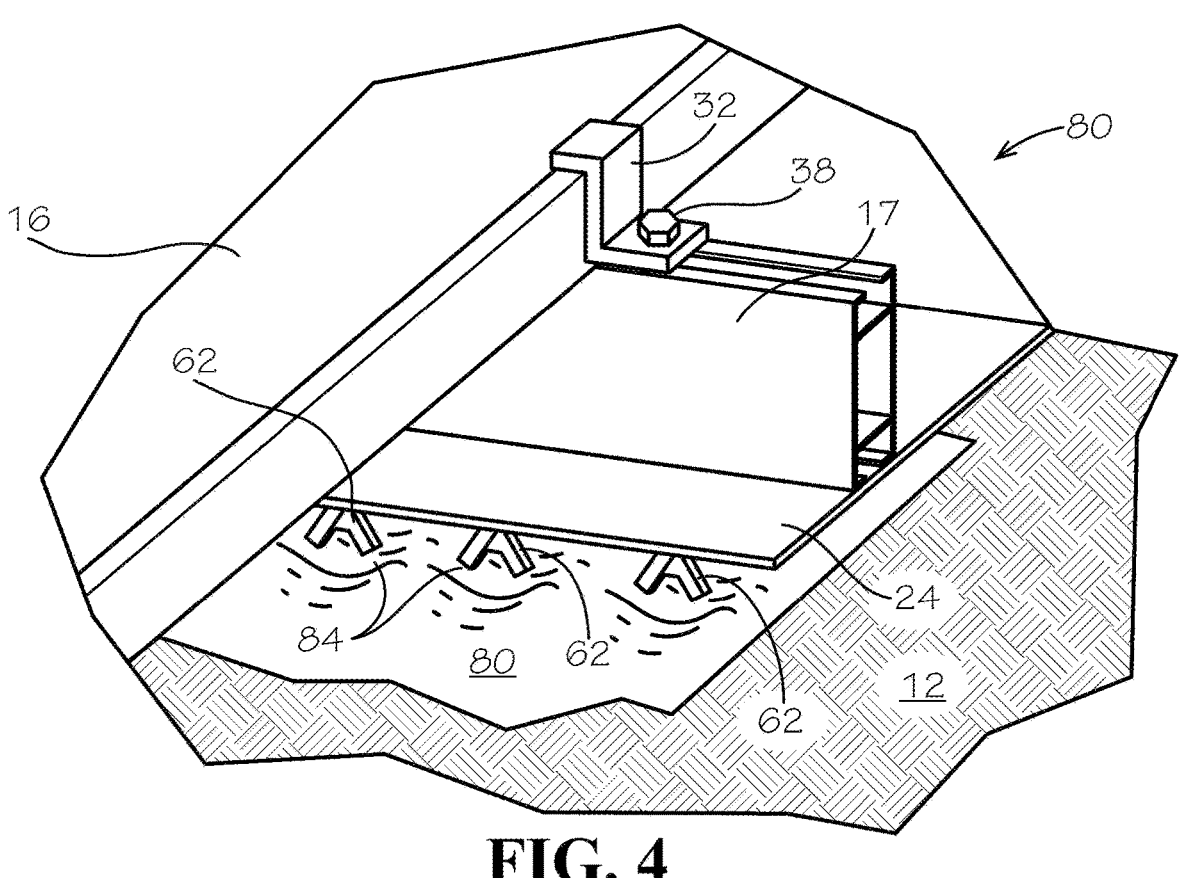
FIG. 4 illustrates a detailed side view of a second embodiment of a low-profile solar energy system installed on a greenfield land site, providing conforming engagement of a ground cover and a flexible friction member for securing a support rail for the photovoltaic modules to the ground cover.

FIG. 4 illustrates a detailed side view of a second embodiment 80 of a solar energy system installed on a greenfield land site, providing conforming engagement of a ground cover and a friction member for securing a support rail for the photovoltaic modules to the ground cover. This embodiment uses a flexible sheet 82 for the ground barrier cover 26. The sheet 82 is a puncture resistant sheet geomembrane that is impermeable to water flow yet with flexibility for seating of the friction-engaging device 24 on the upper surface without the projecting members 62 punching through. The seating of the friction engaging strip 24 causes the sheet geomembrane to gather, wrinkle, depress flexibly, or bunch 84 together in situ at the contact points of the distal ends of the projecting members 62. This in situ flexing during installation creates ridges and valleys generally 85 in the geomembrane sheet 82 for receiving therein the distal ends of the projecting members 62. The surfaces of the ridges and valley against the members 62 to resist movement of the solar energy system 10 under loading such as from wind forces.

Figure 5:
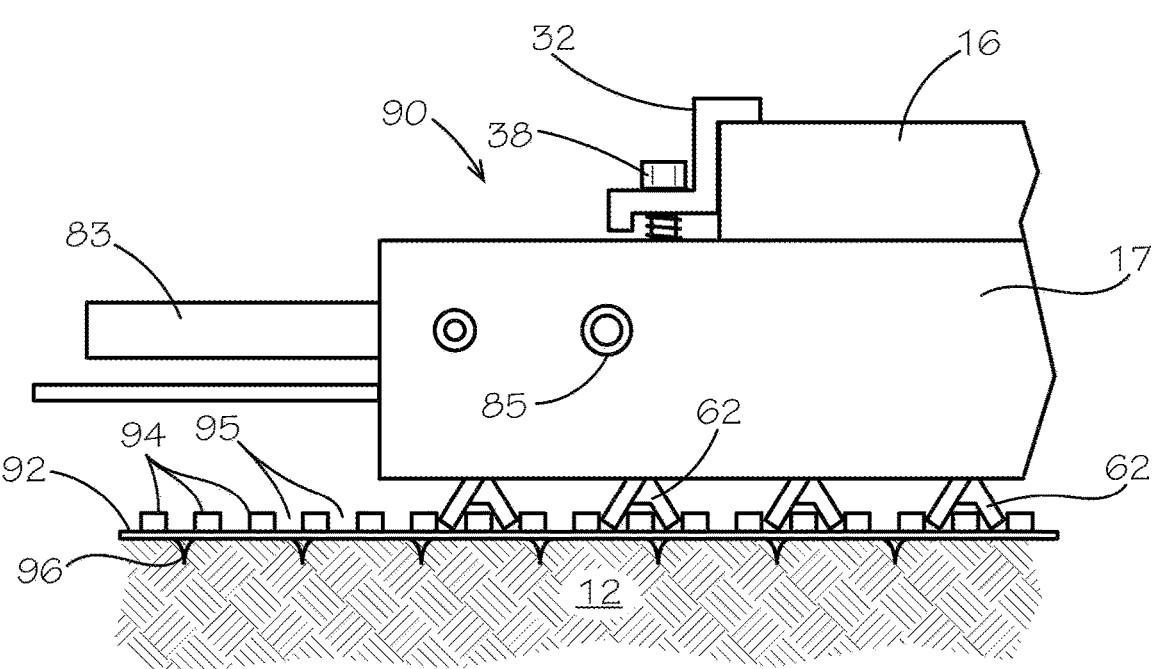
FIG. 5 illustrates a detailed side view of a third embodiment of a low-profile solar energy system installed on a greenfield land site, providing engagement of a structured ground cover and a friction member for securing a support rail for the photovoltaic modules to the ground cover.
Figures 5A, 6, 6A:
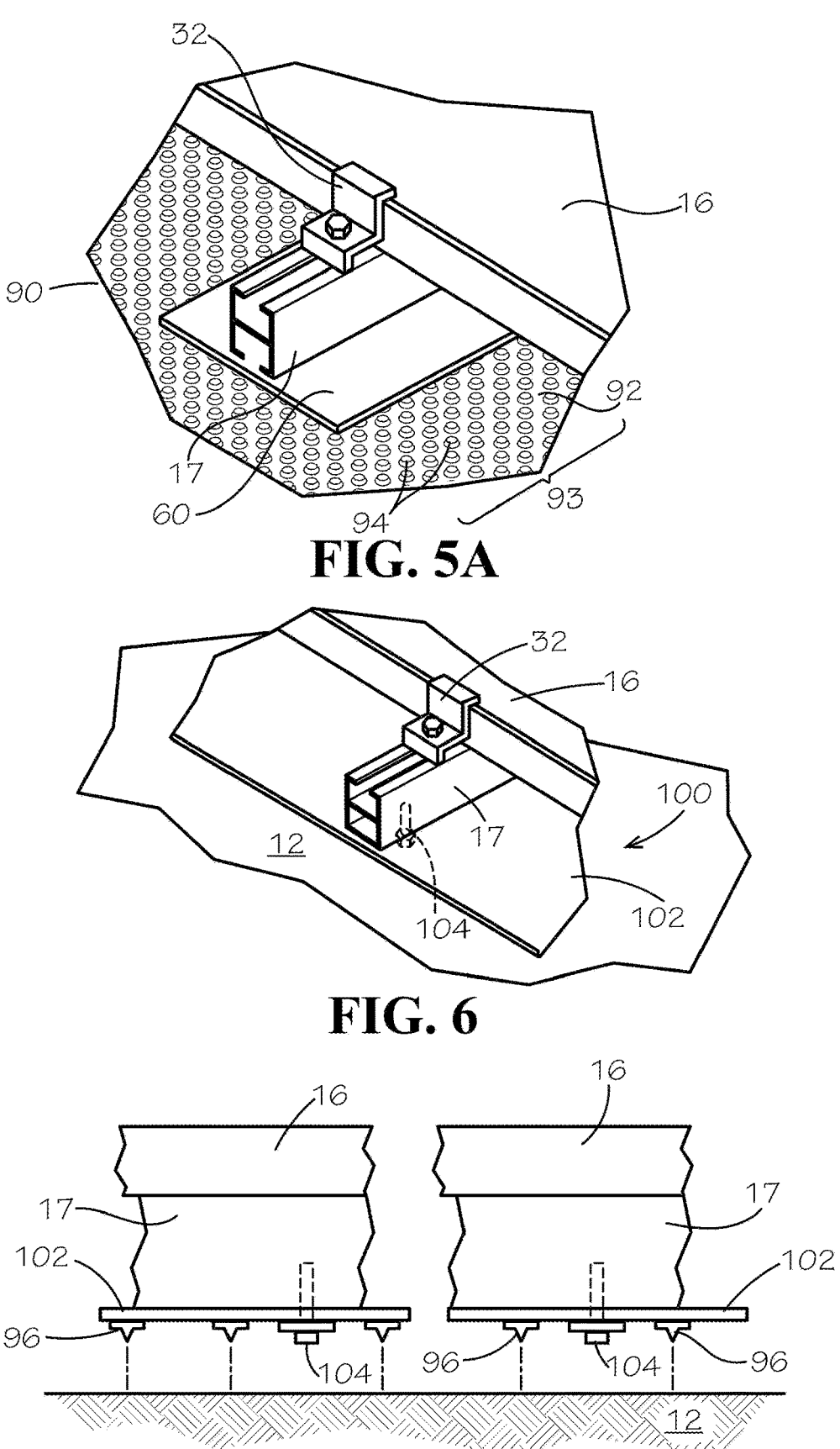
FIG. 5A illustrates in perspective view the third embodiment of the low-profile solar energy system illustrated in FIG. 5 showing a field of drainage studs of a structured ground cover for engagement to a friction member for securing a support rail for the photovoltaic modules to the ground.
FIG. 6 illustrates in perspective view a fourth embodiment of a low-profile solar energy system installed on a greenfield land site, providing a structured geomembrane attached to the rail for supporting the photovoltaic modules with the structured geomembrane in ground-covering frictional engagement with the ground of the greenfield land site.
FIG. 6A illustrates a detailed side view of the fourth embodiment of the low-profile solar energy system installed on a greenfield land site with the structured geomembrane in ground-covering frictional engagement with the ground of the greenfield land site.

FIG. 5 illustrates a detailed side view of a third embodiment of a solar energy system 90 installed on a greenfield land site, providing engagement of a structured ground cover 92 and a friction member 24 for securing the support rail 17 for the photovoltaic modules 16 to the ground. This embodiment uses a structured geomembrane 92 for the ground barrier cover 26. The structured geomembrane 92 includes a field of a plurality of drainage studs 94 extending from an upper surface as shown in FIG. 5A. The studs 94 space the structured geomembrane from the friction-engaging device 24 for defining a gap for water flow paths for drainage of ambient water. The projecting members 62 of the friction-engaging device 24 lock into engagement with the drainage studs 94 for securing the racking system 18 to the ground barrier cover 26. In another embodiment, the structured geomembrane 92 may include a plurality of spikes 96 extending from an opposing surface. The spikes 96 engage the ground 12 for securing the geomembrane 92 to the ground.

FIG. 6 illustrates a detailed side view of a fourth embodiment of a solar energy system 100 installed on a greenfield land site, providing mating engagement to the ground 12 by a structured geomembrane 102 for covering of the greenfield 12 ground cover and as a friction member for securing the rail 17 supporting the photovoltaic modules to the ground. In this embodiment, a plurality of fasteners 104 connect the structured geomembrane 102 to the bottom surface of the rail 17. The rail 17 in this embodiment has planar bottom surface rather than a slotted base. The fasteners may be threaded screws each with a plate washer to bear on a bottom surface of the geomembrane while the screws engage the rail. In an embodiment using the structured membrane 92, the plurality of drainage studs 94 extending upwardly lockingly engage the rail 17. During installation of the solar energy system 100, the plurality of spikes 96 extending from the opposing surface of the geomembrane 102 engage the surface of the ground 12, as illustrated in FIG. 6A.

FIG. 7A illustrates an exploded detailed side view of a fifth embodiment of a solar energy system 110 for installation on a greenfield land site. The solar energy system 110 includes a plurality of strips 112 of a tufted geotextile attached to geomembrane for frictional engagement of the rail to the ground cover. A tufted geotextile comprises a backing sheet tufted with yarns to define a plurality of members extending from a surface as simulated blades of grass. The strip of a tufted geotextile 112 attaches to the geomembrane 92 in alignment with the rail 17. The strip 112 may attach such as with adhesive or melt bonding together. The geomembrane in this embodiment is preferably smooth or textured although embodiments of structured geomembranes may be used, for example, the embodiment of a structure geomembrane having the depending spikes 96 for ground engagement. The tufted geotextile 112 comprises a backing sheet 114 tufted with yarns to define spaced-apart tufts 116 of simulated grass blades 118. The tufted geotextile 112 secures to the geomembrane 92 with fasteners such as screws, staples, adhesive, heat bonding, or other securing device. The elongate strip 60 attaches to the rail 17. The projecting members 62 of the elongate strip 60 frictionally engage with respective ones of the plurality of simulated blades 118 of grass extending from the tufted geotextile 112 as shown in FIG. 7C. FIG. 7B illustrates this embodiment in end view as shown by line 7B-7B with the projecting members 62 received and engaged with the grass blades 118. A plurality of solar photovoltaic modules 16 sit on the rails 17 and connect with the clips 32 in dense-spaced relation with the gap 31 between adjacent solar photovoltaic modules, which gap 31 ranges up to about 6 inches, preferably about 1 inch to about 2 inches, although a greater gap distance may gainfully be used to provide maintenance access.

The solar photovoltaic modules or panels readily interconnect with a power conditioner for providing generated electrical current to operate electrical devices or to energy storage devices and/or to an electrical distribution grid.

The low-profile energy generation system 10 orients the placement of the photovoltaic modules or panels 16 vertically above and closely to the ground barrier sheet 26 overlying the ground surface site, which orientation ranges from proximately parallel to the ground surface to about a 15 degree angle relative to the ground surface for exposure of the panels to ambient light. The tilted orientation is accomplished on substantially flat ground surfaces with spacers received between the panel 16 and the rail 17. The spacer in a first embodiment comprises a length of a rail similar to rail 17 but with a greater height for disposing one side of the panel 16 higher than an opposing side relative to the rail.

The forgoing discloses a support system of lower cost and labor for supporting an installed solar energy system for generation of electrical energy for supply to an electrical distribution grid, which solar energy system uses an array of a plurality of photovoltaic modules or panels generally parallel to the ground and closely spaced apart and mounted on a racking system to space the panels vertically above the ground or optionally above a ground barrier sheet that covers an installation site for vegetation control and for exposure of the panels to ambient light. The solar panels 16 interconnect conventionally for communication of generated electricity to a conditioner device that connects in an electrical substation to an electrical distribution branch for supplying alternating current to an electrical grid. Alternatively, the conditioner device supplies a battery storage system. The opposing leading and trailing end portions of the racking system are secured by respective earth engaging members that engage into the ground. The interior portions of the racking system are secured by friction members. The leading and trailing opposing ends of the racking system are proximate the "perimeter panels" of the array, which perimeter panels refers to the leading or trailing panels of a connected longitudinal line of the panels attached to the racking system in the array, which leading or tailing panel is adjacent another panel on one side but is not adjacent panels on opposing sides in the connected line of panels.

Various embodiments are disclosed for the friction engagement of the intermediate portion of the rail that supports intermediate panels in the array of low-profile densely-spaced photovoltaic panels, which support systems incorporate the leading and trailing end earth anchors. These anchors resist wind shear forces of wind flowing towards the array and over and under the array, which perimeter portions may experience an increase in laminar vortex velocity of the wind while the intermediate panels have reduced exposure to wind uplift due to more turbulent flow of the wind under and over the vertically closely-spaced photovoltaic modules. The low-profile orientation of the photovoltaic module allows for dense spacing of adjacent photovoltaic modules in an array. This sacrifices efficiency of energy generation for increased energy generation capacity per acre by the economy of scale installation of close spacing of the photovoltaic modules on a land site. Land costs are thereby reduced as well.

It thus is seen that the foregoing describes a racking apparatus for supporting a low-profile dense-spaced solar panel array energy system. Although the racking apparatus has been illustrated and described in various embodiments and site applications, it should be understood that many modifications, additions, and deletions may be made without departure from the scope of the invention as set forth in the claims.

What is claimed is:

1. A solar energy racking system, comprising:
a pair of opposing elongated rails for disposing in spaced-apart relation on a surface;
a pair of anchors for each elongated rail of the pair of opposing elongated rails, said pair of anchors for connecting to the surface and to respective opposing portions of said elongated rail of the pair of opposing elongated rails;
each elongated rail having a friction engaging strip attached intermediate the anchors and a plurality of projecting members extending from a bottom surface of the friction engaging strip;
a geomembrane sheet for overlying the surface, said geomembrane sheet defining a plurality of spaced-apart seats for receiving the plurality of projecting members for mechanical engagement of the friction engaging strip thereto; and
a solar photovoltaic module for securing to the pair of opposing elongated rails with a plurality of clips, each one of said plurality of clips for fixedly attaching to a respective elongated rail of the pair of opposing elongated rails and for engaging the solar photovoltaic module,
whereby the solar photovoltaic module being secured with the plurality of clips to the opposing elongated rails fastened to the surface for electrical generation.

2. The solar energy racking system as recited in claim 1, wherein the plurality of projecting members comprise pairs of projections extending in opposing directions.

3. The solar energy racking system as recited in claim 1, further comprising a plurality of fasteners disposed in spaced-apart relation for connecting the friction engaging strips to a respective one elongated rail of the opposing elongated rails.

4. The solar energy racking system as recited in claim 1, wherein the plurality of seats comprise recesses each configured for receiving a respective one of the projecting members extending from the friction engaging strip.

5. The solar energy racking system as recited in claim 4, wherein the projecting members are arranged in pairs for projections to extend in opposing directions; and wherein the recesses are pairs of pockets oriented at opposing angles for conforming to the pairs of projections.

6. The solar energy racking system as recited in claim 5, wherein each of the pairs of pockets are spaced-apart by a respective bridge, and said bridge receiving a portion of a ground surface overlaid by said geomembrane sheet.

7. The solar energy racking system as recited in claim 1, wherein the geomembrane sheet defines a plurality of through openings for flow of ambient water into the ground.

8. The solar energy racking system as recited in claim 1, wherein the geomembrane sheet comprises a sheet that depresses flexibly upon seating of the projecting members thereon to define respective valleys that receive the projecting members and ridges for resisting movement of the friction engaging strip.

9. The solar energy racking system as recited in claim 1, wherein the geomembrane sheet has a plurality of studs extending from a surface for engaging the projecting members and spacing the geomembrane from the friction engaging strip to define water flow paths.

10. The solar energy racking system as recited in claim 9, wherein the geomembrane sheet further comprises a plurality of spikes extending from an opposing surface for engaging a ground surface.

11. The solar energy racking system as recited in claim 1, wherein the geomembrane sheet has a plurality of spikes extending therefrom for engaging a ground surface.

12. The solar energy racking system as recited in claim 1, further comprising an elongated strip of a tufted geotextile attached to the geomembrane sheet, whereby the projecting members extending from the friction engaging strip frictionally engage the tufted geotextile.

13. The solar energy racking system as recited in claim 12, wherein the tufted geotextile comprises a backing sheet tufted with a plurality of yarns extending therefrom as blades of simulated grass, whereby the projecting members extending from the friction engaging strip frictionally engage the blades of simulated grass.

14. The solar energy racking system as recited in claim 1, further comprising a second photovoltaic module and a third photovoltaic module, for attaching with the photovoltaic module in spaced-apart relation to the opposing elongated rails as a linear array having a leading perimeter photovoltaic module and a trailing perimeter photovoltaic module at opposing ends of the array and at least one intermediate photovoltaic module therebetween.

15. The solar energy racking system as recited in claim 1, wherein each of said pair of anchors comprises a plate, a ground engaging member extending in a first direction therefrom for connecting to the surface, and a threaded rod extending in a second direction for engaging the respective elongated rail.

16. The solar energy racking system as recited in claim 1, wherein the pair of opposing elongated rails each have a height for disposing the solar photovoltaic module above a ground surface in a range from about 2 inches to about 24 inches.

17. The solar energy racking system as recited in claim 1, wherein the clips are attached in spaced relation for disposing the solar photovoltaic module in adjacent relation to a second solar photovoltaic module with a gap of up to about 6 inches apart.

\* \* \* \* \*